United States Patent
Tanaka et al.

[11] Patent Number: 6,042,926
[45] Date of Patent: *Mar. 28, 2000

[54] GLASS SUBSTRATE AND THIN FILM COMBINATION AND METHOD FOR PRODUCING THE SAME

[75] Inventors: Keiichi Tanaka, Taki-gun; Yoshiharu Kataoka, Suita; Masaya Okamoto, Soraku-gun; Mikio Katayama, Ikoma, all of Japan

[73] Assignee: Sharp Kabushiki Kaisha, Osaka, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/672,548

[22] Filed: Jun. 28, 1996

[30] Foreign Application Priority Data

Jun. 29, 1995 [JP] Japan .................................. 7-163987

[51] Int. Cl.⁷ ................................. B05D 3/12; B32B 3/30
[52] U.S. Cl. .......................... 428/141; 428/220; 428/156; 428/161; 428/213; 427/290; 427/292
[58] Field of Search .................................. 428/141, 220, 428/156, 161, 213; 427/290, 292

[56] References Cited

U.S. PATENT DOCUMENTS

| | | | |
|---|---|---|---|
| 3,813,568 | 5/1974 | Scott et al. | 313/92 R |
| 4,106,859 | 8/1978 | Doriguzzi et al. | 350/338 |
| 4,125,640 | 11/1978 | Conant et al. | 427/250 |
| 4,247,579 | 1/1981 | Tuft | 427/91 |
| 5,288,515 | 2/1994 | Nakamura et al. | 427/58 |
| 5,342,690 | 8/1994 | Platts | 428/410 |
| 5,558,789 | 9/1996 | Singh | 219/121.69 |
| 5,792,327 | 8/1998 | Belscher et al. | 204/192.15 |

*Primary Examiner*—William P. Watkins, III
*Attorney, Agent, or Firm*—David G. Conlin; Peter F. Corless; Dike, Bronstein, Roberts & Cushman, LLP

[57] ABSTRACT

In a glass substrate and thin film combination, the glass substrate has a surface which is at least partially non-smooth, and the thin film is provided on the glass substrate in contact with the non-smooth part of the surface. Such a glass substrate and thin film combination is produced by forming a non-smooth part on at least a part of a surface of a glass substrate; and depositing a thin film on the glass substrate so as to be in contact with the non-smooth part.

24 Claims, 8 Drawing Sheets

Microscope      NSIII AFM
Scan size       8.0 μm
Setpoint        −0.3 V
Scan rate       4.8 Hz
Number of samples   512

□ View angle
☼ Light angle

0 deg

X 2.000 μm/div
Z 10.000 nm/div

FIG. 7

Microscope NSIII AFM
Scan size 8.0 μm
Setpoint −10.0 V
Scan rate 4.8 Hz
Number of samples 512

◻ View angle
☼ Light angle

X 2.000 μm/div
Z 10.000 nm/div 0 deg

GLASS SUBSTRATE AND THIN FILM COMBINATION AND METHOD FOR PRODUCING THE SAME

BACKGROUND OF THE INVENTION

1. Field of the Invention

The present invention relates to a glass substrate and thin film combination used for, for example, a liquid crystal display device, and a method for producing the same.

2. Description of the Related Art

Recently, liquid crystal panels have been increasingly demanded. In many liquid crystal display devices including a liquid crystal panel, a glass substrate is coated with a thin film formed of a metal, semiconductor, or insulative material directly deposited thereon to be used as a material for an electrode or the like. In liquid crystal display devices including transistors or MIM devices, the glass substrate needs to be sufficiently flat. A glass substrate which is flat and also smooth is conventionally used. Such a smooth glass substrate has inferior adhesion with a thin film formed of a metal or the like and thus causes the thin film to peel off relatively easily.

Figure 10:
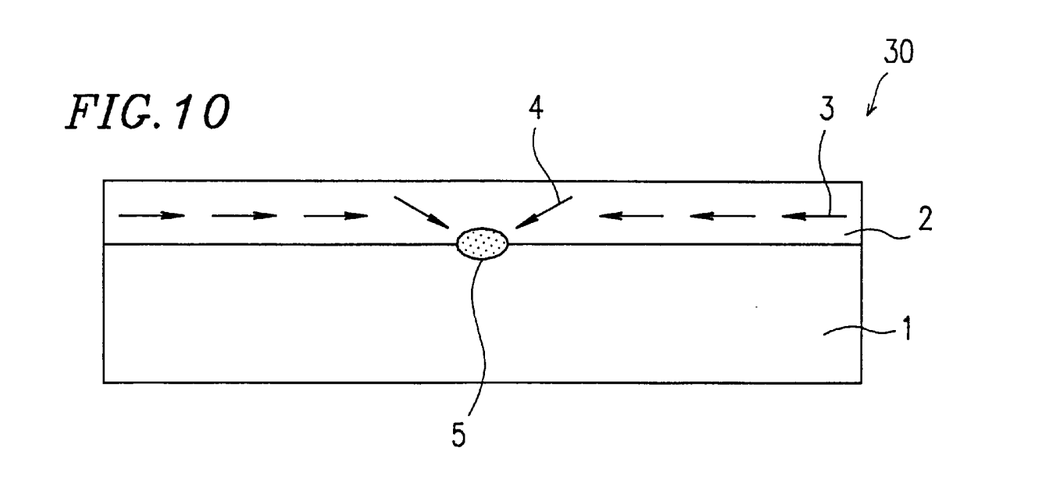
FIG. 10 is a cross sectional view of a conventional glass substrate and thin film combination.

With reference to FIG. 10, a cause of the peeling-off will be described. FIG. 10 is a cross sectional view of a conventional glass substrate and thin film combination 30 including a smooth glass substrate 1 and a thin film 2 provided thereon.

The thin film 2 is directly deposited on the smooth glass substrate 1 having irregularities, each of which has a height of about 1 nm to about 5 nm and a width of about 100 nm to about 2 $\mu$m. In this specification, the term "width" refers to a distance between two adjacent irregularities. A surface having irregularities each having a height of about 5 nm or less and a width of about 2 $\mu$m or more is defined as a "smooth surface".

A stress generated by thermal strain and by the glass substrate 1 and the thin film 2 which is applied during the deposition of the thin film 2 concentrates on the interface between the glass substrate 1 and the thin film 2 as an inner stress 4. As a result, a strain is generated at a portion 5 at which the adhesion between the glass substrate 1 and the thin film 2 is weaker than the rest of the interface. Such a strain causes the peeling-off. A thin film formed of a low-resistance metal such as Al, Ta, Mo, Mo—Ta, or Ti peels off more significantly. A semiconductor thin film formed of a single element such as Si or Ge or a mixed crystal such as GaAs or Si—Ge, and an insulative thin film formed of a nitride such as $SiN_x$ or an oxide such as $SiO_x$ also peel off relatively easily by the same mechanism.

Conventionally, in order to avoid such peeling-off, an insulative thin film is formed on the glass substrate by spin-coating, CVD or PVD as an overcoat before the thin film is deposited. The overcoat is used in order to provide protection of the surface of the glass substrate which is required by the process and also in order to avoid concentration of the stress in a local area in the thin film. The overcoat, which has a quite rough surface morphology, alleviates the stress and thus maintains the adhesion between the glass substrate and the thin film at a satisfactory level. However, formation of such an overcoat increases the number of production steps of the display device and thus raises production cost.

SUMMARY OF THE INVENTION

According to one aspect of the present invention, in a glass substrate and thin film combination, the glass substrate has a surface which is at least partially non-smooth, and the thin film is provided on the glass substrate in contact with the non-smooth part of the surface.

In another aspect of the present invention, a method for producing a glass substrate and thin film combination includes the steps of forming a non-smooth part on at least a part of a surface of a glass substrate; and depositing a thin film on the glass substrate so as to be in contact with the non-smooth part.

Thus, the invention described herein makes possible the advantages of providing a combination of a glass substrate and a conductor, semiconductor, or insulative thin film adhere to each other with a sufficient strength without an overcoat, and a method for producing the same.

These and other advantages of the present invention will become apparent to those skilled in the art upon reading and understanding the following detailed description with reference to the accompanying figures.

DESCRIPTION OF THE PREFERRED EMBODIMENTS

Hereinafter, the present invention will be described by way of illustrative examples with reference to the accompanying drawings.

EXAMPLE 1

Figure 1:
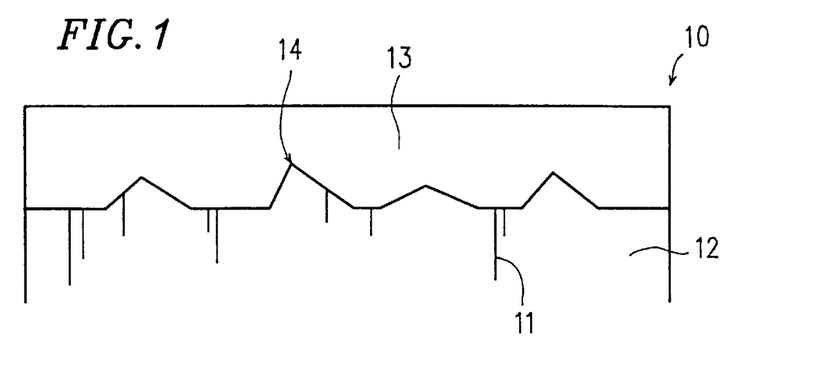
FIG. 1 is a cross sectional view of a glass substrate and thin film combination in a first example in accordance with the present invention.

FIG. 1 is a cross sectional view of a glass substrate and thin film combination 10 in a first example in accordance with the present invention. A thin film 13 is provided on a glass substrate 12.

The glass substrate 12 has a non-smooth surface with a surface morphology having irregularities 14, and microcracks 11. The irregularities 14 and the microcracks 11 are formed by mechanical abrasion. The thin film 13 is extended into the microcracks 11.

The glass substrate and thin film combination 10 is produced in the following manner.

Figure 2A:
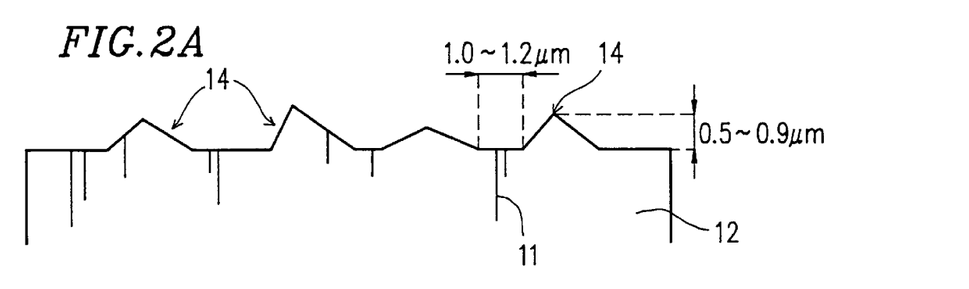
FIGS. 2A and 2B are cross sectional views showing a method for producing the glass substrate and thin film combination shown in FIG. 1.

First, a surface of a glass substrate is abraded by an iron oxide powder having a grain size of about 0.3 µm to about 0.7 µm, thereby obtaining the glass substrate 12 as shown in FIG. 2A with a surface morphology having the irregularities 14 each having a height of about 0.5 µm to about 0.9 µm and a width of about 1 µm to about 1.2 µm. The glass substrate 12 also obtains the microcracks 11 in a surface portion thereof (portion immediately below the surface of the glass substrate) by a mechanical impact applied by the abrasion. The microcracks 11 each has a depth of about 1 nm to about 1,000 nm from the surface of the glass substrate 12.

In this specification, a surface which has irregularities each having a height of about 0.01 µm to about 2 µm and a width of 0.05 µm to about 1.2 µm or has microcracks each having a depth of about 1 nm to about 1,000 nm is defined as a "non-smooth surface".

Figure 2B:
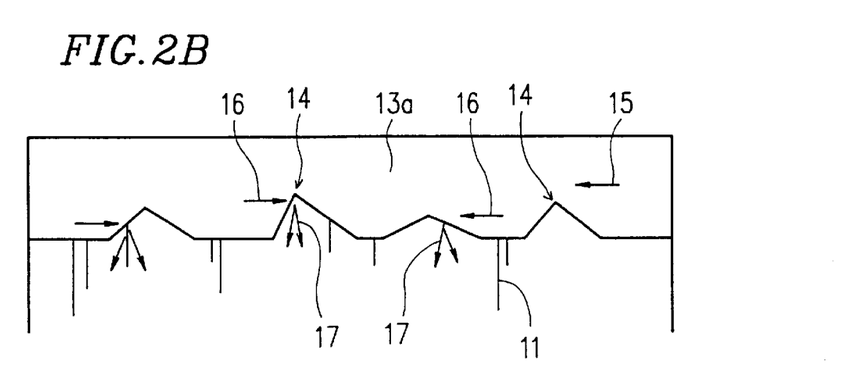

Next, as shown in FIG. 2B, a metal thin film 13a, such as a Ta thin film, is deposited on the glass substrate 12 by sputtering or the like to a thickness of about 100 nm to about 1,000 nm so as to be in contact with the non-smooth surface of the glass substrate 12.

Due to the irregularities 14 and the microcracks 11 of the glass substrate 12, the contact area between the glass substrate 12 and the metal thin film 13a is enlarged, and thus the adhesion between the glass substrate 12 and the metal thin film 13a is improved.

The irregularities 14 and the microcracks 11 further enhance such adhesion by the mechanism described below with reference to FIG. 2B.

As shown in FIG. 2B, a stress 15 generated by the glass substrate 12 and the metal thin film 13a and by thermal strain moves to the interface between the glass substrate 12 and the metal thin film 13a as represented by reference numeral 16. The stress 16 is dissipated into a plurality of directions by the irregularities 14 and the microcracks 11 as represented by reference numeral 17. Since concentration of the stress at the interface is avoided, peeling-off of the metal thin film 13a from the glass substrate 12 is prevented.

A tape peel test is performed for the glass substrate and thin film combination 10 in the first example and the conventional glass substrate and thin film combination 30 as a comparative example. The thin films of both of the combinations 10 and 30 are formed of a metal.

Figure 3:
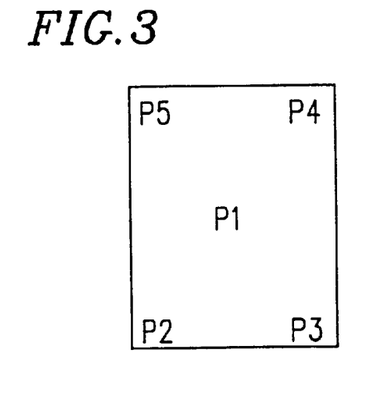
FIG. 3 is a plan view of a thin film showing areas subjected to a tape peel test.

The tape peel test is performed in the following manner. The metal thin film provided on each glass substrate is cut in straight lines in two perpendicular directions by a cutting knife to make a plurality of squares or rectangles (also referred to as "points"). An adhesive tape is applied to the metal thin film and peeled off to check if the metal thin film is also peeled off. The adhesive tape is peeled off in areas P1 (center) and P2 through P5 (corners) as shown in FIG. 3.

Table 1 shows the ratio of the number of points of the metal thin film at which the metal thin film is peeled off with respect to the total number of points. In Table 1, for example, "14/20" indicates that the metal thin film is peeled off at 14 points out of 20 in the corresponding area (area P2 in this case).

TABLE 1

|  | P1 | P2 | P3 | P4 | P5 |
|---|---|---|---|---|---|
| Example 1 | 0/20 | 14/20 | 5/20 | 6/20 | 3/20 |
| Comparative | 20/20 | 20/20 | 20/20 | 20/20 | 20/20 |

As appreciated from Table 1, the number of points at which the metal thin film is peeled off is less in the case of the combination 10 in the first example than in the case of the combination 30 as the comparative example. In fact, the metal thin film of the comparative example is peeled off at all the points.

As described above, the surface of the glass substrate 12 in the first example has a surface morphology having irregularities 14 as a result of mechanical abrasion. The irregularities 14 increase the contact area between the glass substrate 12 and the thin film 13, and thus improve the adhesion therebetween. The glass substrate 12 also has microcracks 11 formed by the impact generated by the mechanical abrasion. The microcracks 11 also increase the contact area between the glass substrate 12 and the thin film 13, thus improving the adhesion therebetween. Moreover, due to the irregularities 14 and the microcracks 11, the stress which tends to concentrate on the interface between the glass substrate 12 and the thin film 13 is broken into a plurality of directions. As a result, the peeling-off of the thin film 13 from the glass substrate 12 is prevented.

By controlling the surface morphology, namely, the size and the shape of the irregularities 14, a preferable contact area is obtained.

The glass substrate 12 is preferably non-smooth throughout the entire surface on which the thin film is to be formed. Even in the case where the surface is partially non-smooth, the effect can be obtained to a certain degree.

The metal thin film 13a is provided on the glass substrate 12 in this example, but the thin film can be formed of a non-metal conductive layer, a semiconductor layer, an insulative layer, or a layer including at least two of these layers.

The surface of glass substrate 12 is abraded by an iron oxide powder in this example, but can also be abraded by an alumina powder, a cloth, zinc oxide, caesium or the like.

In the first example, a thin film formed of a conductor layer, a semiconductor layer, or an insulative layer, or alternatively a layer including at least two of these layers, can be provided on the glass substrate with sufficient adhesion. Since an overcoat is not used, the number of production steps, and thereby production costs, are reduced. Reduction in the production yield and quality destruction of the display device caused by the peeling-off of the metal thin film are also prevented.

EXAMPLE 2

Figure 4:
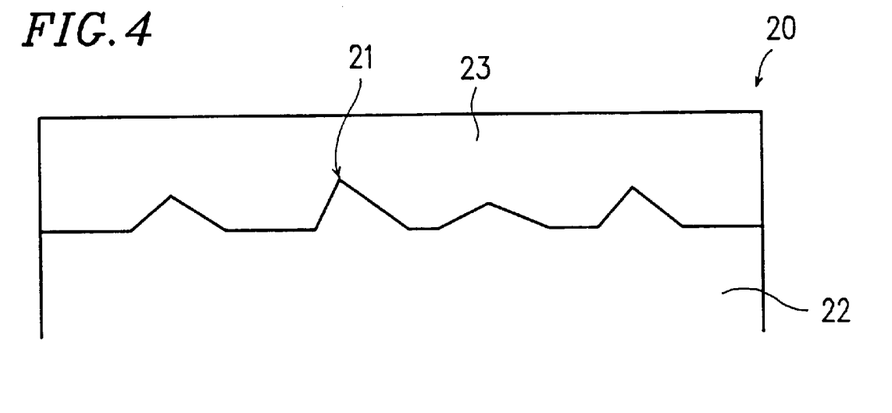
FIG. 4 is a cross sectional view of a glass substrate and thin film combination in a second example in accordance with the present invention.

FIG. 4 is a cross sectional view of a glass substrate and thin film combination 20 in a second example in accordance with the present invention. A thin film 23 is provided on a glass substrate 22.

The glass substrate 22 has a non-smooth surface with a surface morphology having irregularities 21. The irregularities 21 are formed by treatment with a chemical.

The glass substrate and thin film combination 20 is produced in the following manner.

Figure 5A:
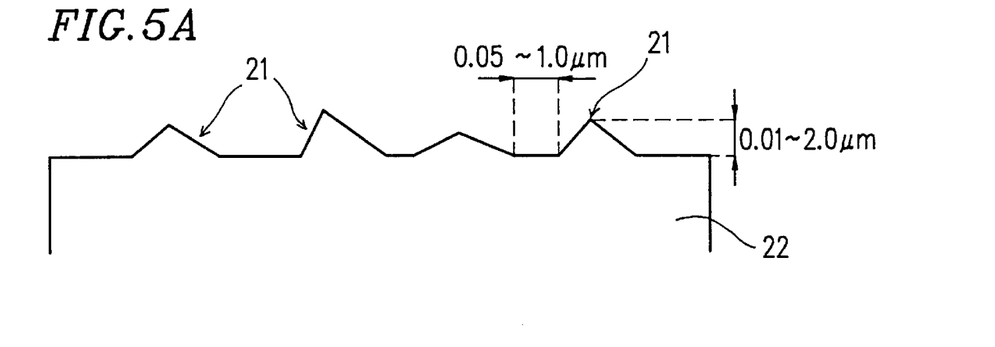
FIGS. 5A and 5B are cross sectional views illustrating a method for producing the glass substrate and thin film combination shown in FIG. 4.

First, a surface of a glass substrate is treated with buffered hydrogen fluoride, thereby obtaining the glass substrate 22 as shown in FIG. 5A with a surface morphology having the irregularities 21 each having a height of about 0.01 μm to about 2.0 μm and a width of about 0.05 μm to about 1.0 μm.

Figure 5B:
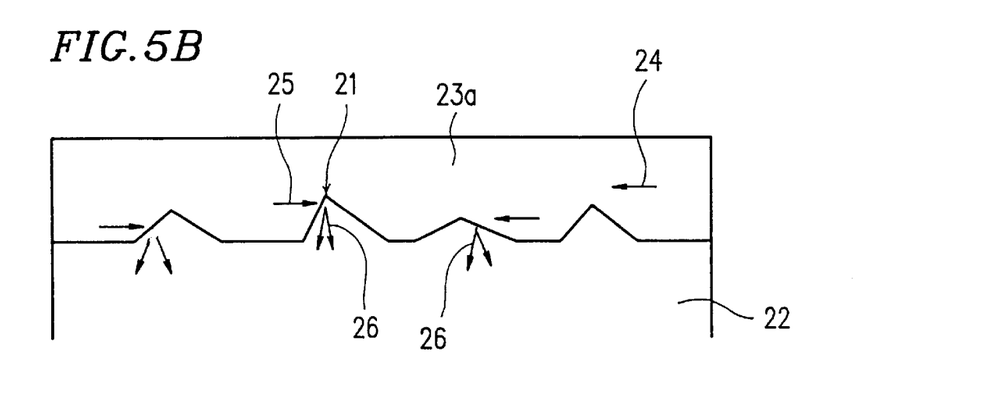

Next, as shown in FIG. 5B, a metal thin film 23a, such as a Ta thin film, is deposited on the glass substrate 22 by sputtering or the like to a thickness of about 100 nm to about 1,000 nm or more so as to be in contact with the non-smooth surface of the glass substrate 22.

Due to the irregularities 21 of the glass substrate 22, the contact area between the glass substrate 22 and the metal thin film 23a is enlarged, and thus the adhesion between the glass substrate 22 and the metal thin film 23a is improved.

The irregularities 21 further enhance such adhesion by the mechanism described below with reference to FIG. 5B.

As shown in FIG. 5B, a stress 24 generated by the glass substrate 22 and the metal thin film 23a and by thermal strain move to the interface between the glass substrate 22 and the metal thin film 23a as represented by reference numeral 25. The stress 25 is dissipated into a plurality of directions by the irregularities 21 as represented by reference numeral 26. Since concentration of the stress at the interface is avoided, peeling-off of the metal thin film 23a from the glass substrate 22 is prevented.

A tape peel test is performed for the glass substrate and thin film combination 20 in the second example and the conventional glass substrate and thin film combination 30 as a comparative example. The thin films of both of the combinations 20 and 30 are formed of a metal. As in the first example, the adhesive tape is peeled off in areas P1 (center) and P2 through P5 (corners) shown in FIG. 3.

TABLE 2

|  | P1 | P2 | P3 | P4 | P5 |
|---|---|---|---|---|---|
| Example 2 | 0/20 | 3/20 | 1/20 | 4/20 | 2/20 |
| Comparative | 20/20 | 20/20 | 20/20 | 26/20 | 20/20 |

As appreciated from Table 2, the number of points at which the metal thin film is peeled off is less in the case of the combination 20 in the second example than in the case of the combination 30 as the comparative example. The results are even better in the glass substrate 22 than in the glass substrate 12 of the first example because the irregularities of the glass substrate 22 have smaller widths and greater heights than the irregularities 14 of the glass substrate 12.

As described above, the surface of the glass substrate 22 in the second example has a surface morphology having irregularities 21 as a result of treatment with a chemical. The irregularities 21 increase the contact area between the glass substrate 22 and the thin film 23, and thus improve the adhesion therebetween. Moreover, due to the irregularities 21, the stress which tends to concentrate on the interface between the glass substrate 22 and the thin film 23 is broken into a plurality of directions. As a result, the peeling-off of the thin film 23 from the glass substrate 22 is prevented.

By controlling the surface morphology, namely, the size and the shape of the irregularities 21, a preferable contact area is obtained.

The glass substrate 22 is preferably non-smooth throughout the entire surface on which the thin film is to be formed. Even in the case where the surface is partially non-smooth, the effect can be obtained to a certain degree.

The metal thin film 23a is provided on the glass substrate 22 in this example but the thin film can be formed of a non-metal conductive layer, a semiconductor layer, or an insulative layer, or alternatively a layer including at least two of these layers.

The surface of glass substrate 22 is treated by buffered hydrogen fluoride in this example, but can be treated by an acid such as hydrogen fluoride, a nitric acid, a hydrochloric acid, an organic acid, and a mixture thereof. Instead of an acid or a mixture of acids, an alkaline solution can also be used. Alternatively, acid gas or alkaline gas can be used.

In the second example, a thin film formed of a conductor layer, a semiconductor layer, or an insulative layer, or alternatively a layer including at least two of these layers, can be provided on the glass substrate with sufficient adhesion. Since an overcoat is not used, the number of production steps, and thereby production costs are reduced. Reduction in the production yield and quality destruction of the display device caused by the peeling-off of the metal thin film are also prevented.

The irregularities on the glass substrate can be formed by a combination of mechanical abrasion and treatment with a chemical.

Figure 6:
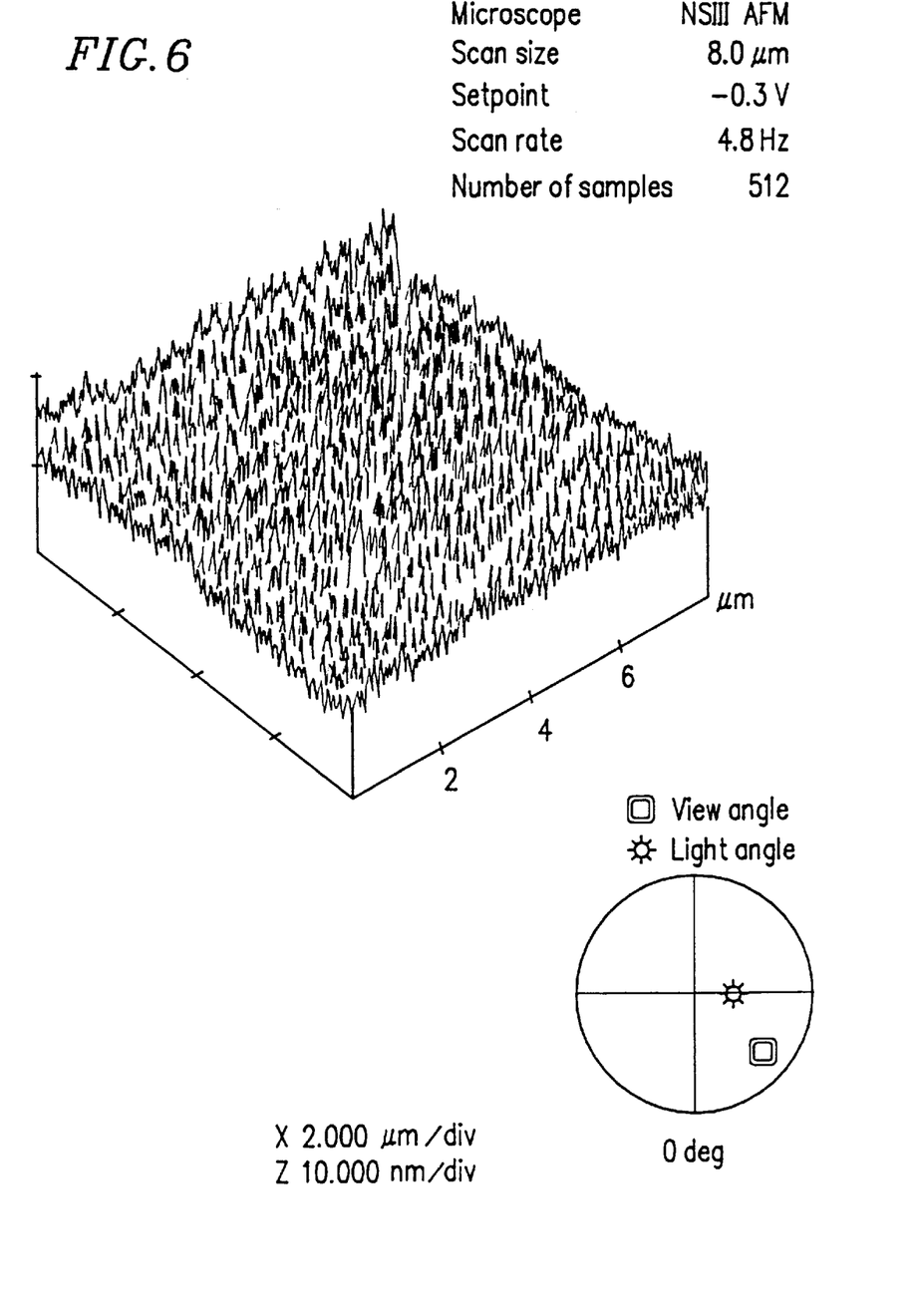
FIG. 6 is a view showing an image of a non-smooth part of a surface of the glass substrate in the first and second examples in accordance with the present invention obtained by an atomic force microscope.
Figure 7:
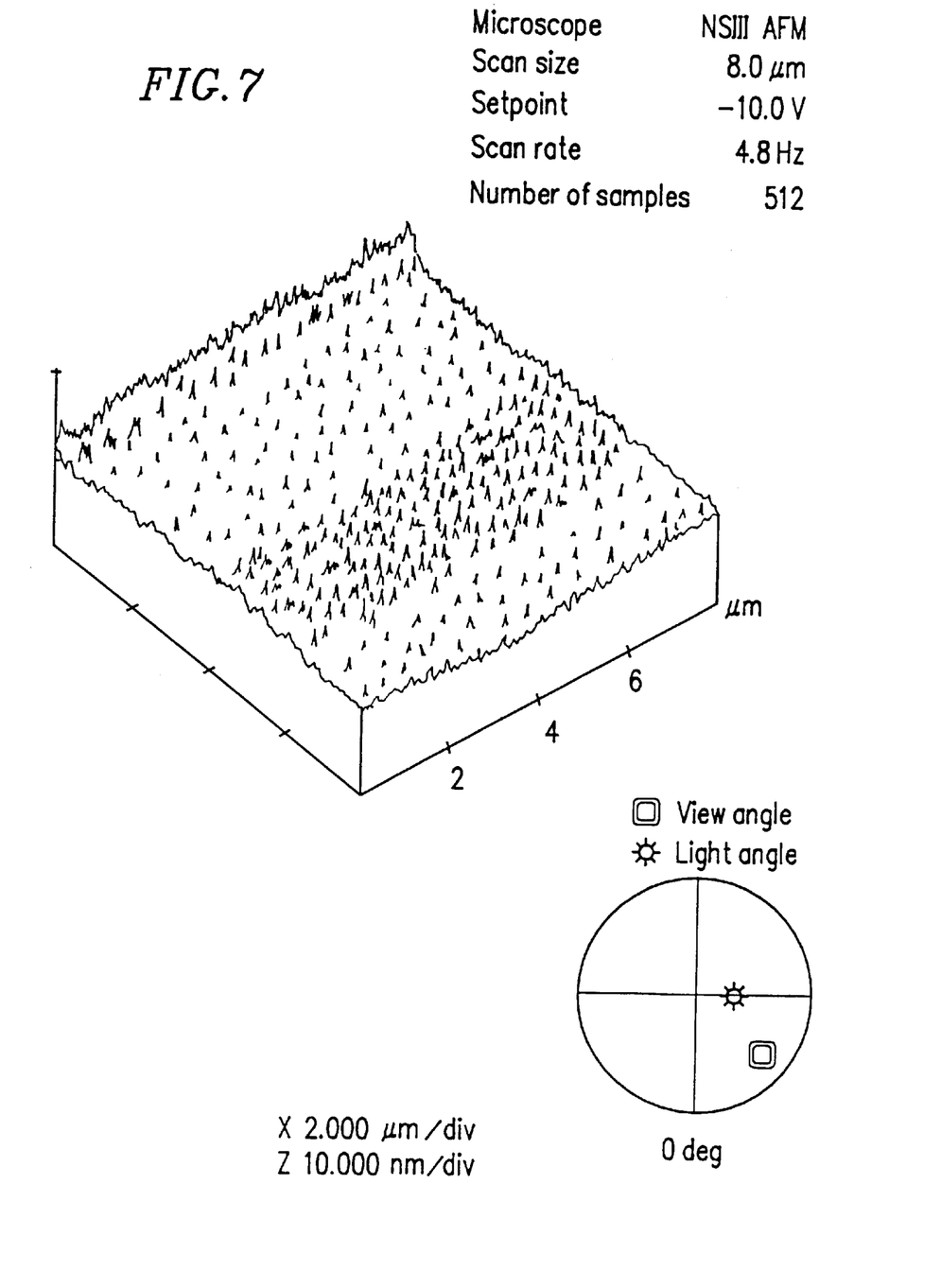
FIG. 7 is a view showing an image of a surface of a conventional glass substrate obtained by an atomic force microscope.
Figure 8:
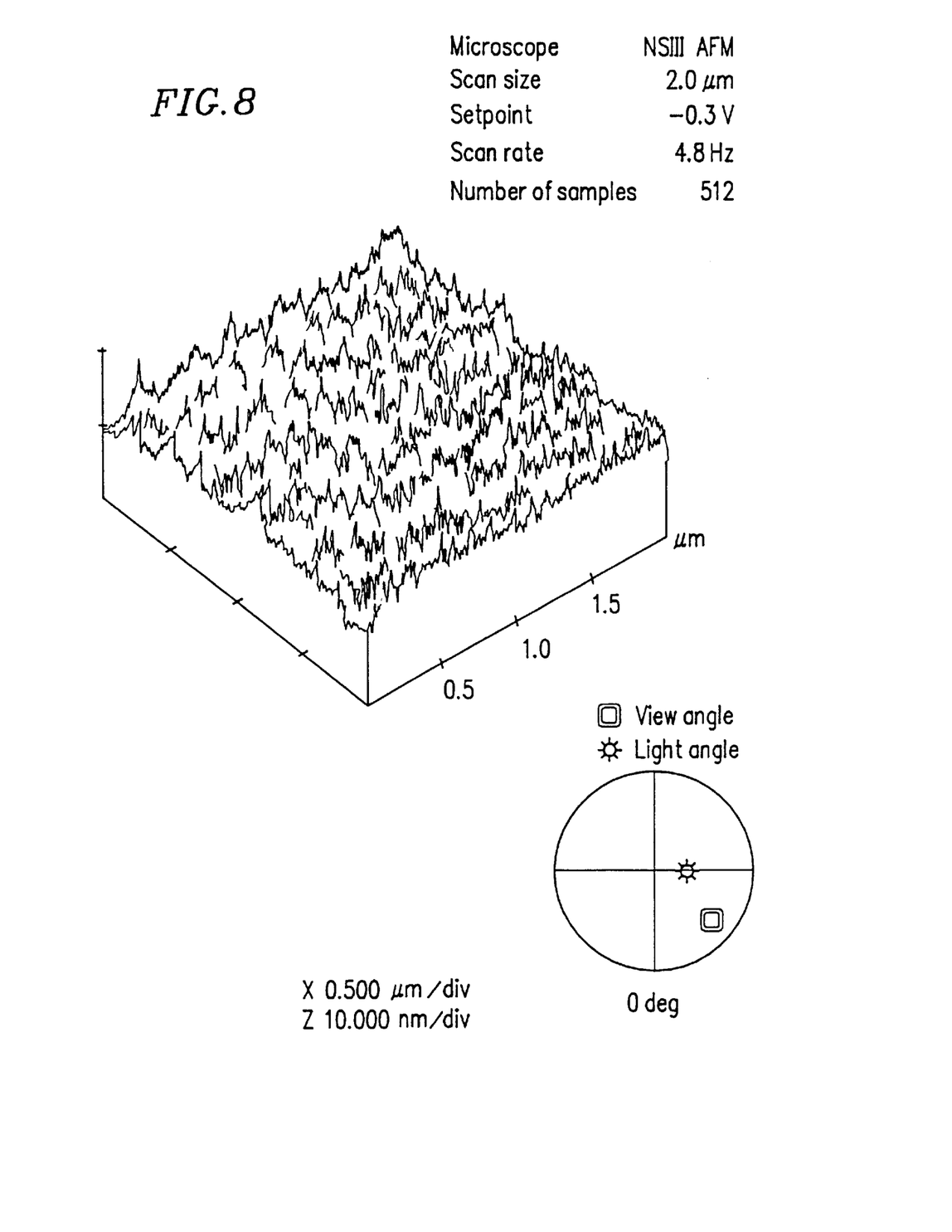
FIG. 8 is a view showing an image of the non-smooth part of the surface of the glass substrate in the first and second examples obtained by an atomic force microscope at a smaller scan size than the image shown in FIG. 6.
Figure 9:
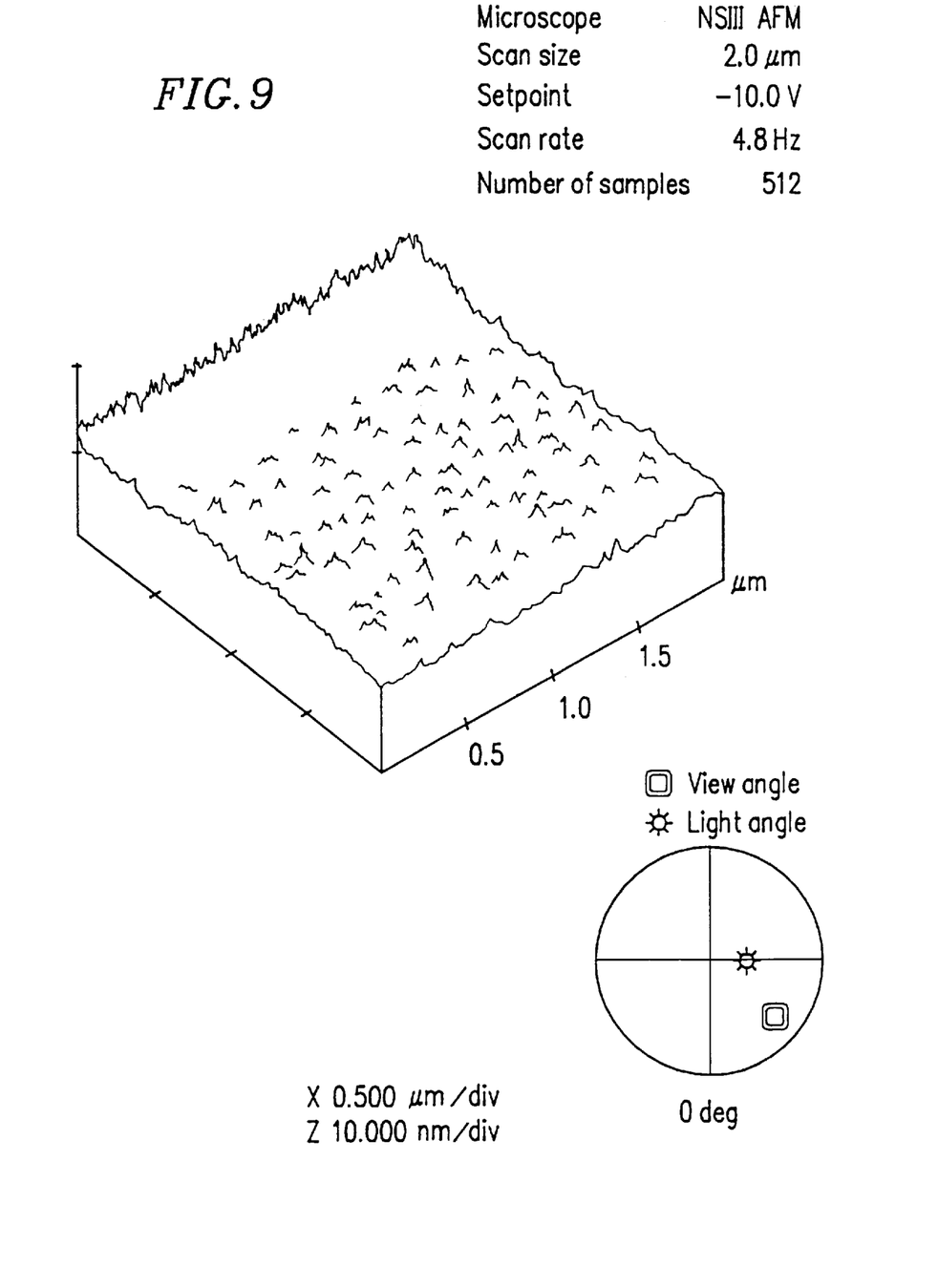
FIG. 9 is a view showing an image of the surface of the conventional glass substrate obtained by an atomic force microscope at a smaller scan size than the image shown in FIG. 7.

The irregularities 14 and 21 in the first and the second examples can be observed by an atomic force microscope. FIGS. 6 and 8 each show an image of the non-smooth surface of the glass substrate according to the present invention obtained by an atomic force microscope. FIGS. 7 and 8 each show an image of the surface of the conventional smooth glass substrate 1 also obtained by an atomic force microscope. The image shown in FIG. 8 is obtained at a smaller scan size than the image shown in FIG. 6. The image shown in FIG. 9 is obtained at a smaller scan size than the image shown in FIG. 7. The images shown in FIGS. 6 through 9 are obtained under the following conditions:

FIG. 6:
Scan size: 8.0 μm
Setpoint: −0.3 V
Scan rate: 4.8 Hz
FIG. 7:
Scan size: 8.0 μm
Setpoint: −10.0 V
Scan rate: 4.8 Hz
FIG. 8:
Scan size: 2.0 μm
Setpoint: −0.3 V
Scan rate: 4.8 Hz
FIG. 9:
Scan size: 2.0 μm
Setpoint: −10.0 V
Scan rate: 4.8 Hz The existence of the microcracks 11 in the first example can be confirmed by a transmission electron microscope.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A glass substrate and thin film combination, wherein the glass substrate has a surface which is at least partially non-smooth, and the thin film is provided on the glass substrate in contact with the non-smooth part of the surface, the non-smooth part having irregularities each having a random height of about 0.01 μm to about 2 μm and a random width of about 0.05 μm to about 1.2 μm.

2. A glass substrate and thin film combination according to claim 1, wherein the non-smooth part is obtained as a result of processing that includes at least one of mechanical abrasion and treatment with a chemical.

3. A glass substrate and thin film combination according to claim 2, wherein the chemical is a liquid.

4. A glass substrate and thin film combination according to claim 1, wherein the thin film includes at least one of a conductor layer, a semiconductor layer and an insulative layer.

5. A glass substrate and thin film combination according to claim 4, wherein the conductor layer is a metal layer.

6. A glass substrate and thin film combination, wherein the glass substrate has a surface which is at least partially non-smooth, and the thin film is provided on the glass substrate in contact with the non-smooth part of the surface, wherein the thin film has a thickness of about 100 nm or more, and the glass substrate has microcracks in at least a part of a surface portion and the thin film is formed in the microcracks.

7. A method for producing a glass substrate and thin film combination, comprising:

forming a non-smooth part on at least a part of a sudfce of a glass substrate which includes mechanically abrading the surface of the glass substrate so as to form microcracks in a surface portion of the glass substrate; and depositing a thin Mm on the glass substrate so as to be in contact with the non-smooth part, wherein the thin has a thickness of about 100 nm or more.

8. A method for producing a glass substrate and thin film combination, comprising the steps of:

forming a non-smooth part on at least a part of a surface of a glass substrate, and wherein irregularities are formed on the non-smooth part each having a random height of about 0.01 µm to about 2 µm and a random width of about 0.05 µm to about 1.2 µm; and depositing a thin film on the glass substrate so as to be in contact with the non-smooth part.

9. A method according to claim 8 wherein the step of forming the non-smooth part includes the step of mechanically abrading the surface of the glass substrate.

10. A method according to claim 8, wherein the step of forming the non-smooth part includes the step of treating the surface of the glass substrate with a chemical.

11. A method according to claim 8, wherein the step of forming the non-smooth part includes the step of treating the surface of the glass substrate with a liquid chemical.

12. A method according to claim 8, wherein the thin film is formed of at least one of a conductor layer, a semiconductor layer, and an insulative layer.

13. A method according to claim 12, wherein the conductor layer is formed of a metal layer.

14. A method according to claim 7, wherein the microcracks each have a depth of about 1 nm to about 1,000 nm from the surface of the glass substrate.

15. A method according to claim 8, wherein the non-smooth part is formed by treatment of the glass substrate surface with a liquid chemical.

16. A method according to claim 8, wherein the non-smooth part is formed by treatment of the glass substrate surface with an acid gas or alkaline gas.

17. A method according to claim 8, wherein an overcoat layer is not applied between the thin film and the glass substrate, and the glass substrate with thin film deposited thereon is incorporated into a liquid crystal display device.

18. A glass substrate and thin film combination according to claim 6, wherein the microcracks are obtained as a result of mechanically abrading the surface of the glass substrate.

19. A glass substrate and thin film combination according to claim 6, wherein the microcracks each have a depth of about 1 nm to about 1,000 nm from the surface of the glass substrate.

20. A method according to claim 8, wherein the step of forming the non-smooth part includes the step of treating the surface of the glass substrate with a gaseous chemical.

21. A method according to claim 9, wherein the mechanical abrading step is performed using an iron oxide powder, an alumina powder, a cloth, zinc oxide, or cesium.

22. A method according to claim 11, wherein the liquid chemical includes a buffered hydrogen fluoride, a hydrogen fluoride, a nitric acid, a hydrochloric acid, an organic acid, or a mixture thereof.

23. A glass substrate and thin film combination according to claim 1, wherein the height of the irregularities is larger than the thickness of the thin film.

24. A method of claim 8, wherein the height of the irregularities is larger than the thickness of the thin film.

* * * * *